June 1, 1965 P. A. STOLL ET AL 3,186,355

AUTOMATED STORAGE SYSTEMS

Filed April 15, 1960 4 Sheets-Sheet 1

INVENTORS
PAUL A. STOLL
EMIL UMBRICHT
BY
Burns, Doane, Benedict, Swecker & Mathis / Brown, ... (signature)
ATTORNEYS June 1, 1965 — P. A. STOLL ETAL — 3,186,355

AUTOMATED STORAGE SYSTEMS

Filed April 15, 1960 — 4 Sheets-Sheet 2

INVENTORS
PAUL A. STOLL
EMIL UMBRICHT
BY
Pennie, Edmonds, Morton, Barrows & Taylor
ATTORNEYS June 1, 1965 P. A. STOLL ETAL 3,186,355

AUTOMATED STORAGE SYSTEMS

Filed April 15, 1960 4 Sheets-Sheet 3

INVENTORS
PAUL A. STOLL
EMIL UMBRICHT
BY
Pennie, Edmonds, Morton, Barrows & Taylor
ATTORNEYS June 1, 1965 P. A. STOLL ETAL 3,186,355

AUTOMATED STORAGE SYSTEMS

Filed April 15, 1960 4 Sheets-Sheet 4

INVENTORS
PAUL A. STOLL
EMIL UMBRICHT
BY
Burns, Doane, Benedict, Swecker & Mathis (signature)
ATTORNEYS United States Patent Office 3,186,355
Patented June 1, 1965

3,186,355
AUTOMATED STORAGE SYSTEMS
Paul A. Stoll, New Milford, Conn., and Emil Umbricht, Northville, Mich. (both % Epco, Incorporated, P.O. Box 335, Pumpkin Hill, New Milford, Conn.)
Filed Apr. 15, 1960, Ser. No. 22,582
19 Claims. (Cl. 104—162)

The present invention relates to storage systems and more particularly to automated storage systems, in which a plurality of storage units are mounted for movement along a path, so that a single aisle space or, in some cases, a small plurality thereof, may be formed between any two of the units. The apparatus of the present invention represents an improvement over, and a more comprehensive application of the apparatus illustrated and described in our co-pending application, Serial No. 823,876, filed June 30, 1959, for "Automated Storage Equipment," now Patent No. 3,055,313.

Conventional storage apparatus, such as shelves, racks, and the like, are arranged to provide an access aisle between each pair of storage units. The aisle space thus required represents a very substantial portion (e.g., usually more than 60 percent) of the over-all storage area, and represents a substantial waste of floor space. It has been proposed, heretofore, to reduce the proportion of waste floor space in a storage arrangement by providing a series of movable storage units, with space in the series for a single access aisle. The storage units are movable on tracks, so that access may be provided to any unit by moving one or more of the units to form an access aisle at the unit selected.

Notwithstanding the many substantial advantages of movable storage equipment as described above, such equipment has not come into widespread use in certain important areas, such as the United States, due to a number of practical problems associated with the manufacture and installation of such apparatus and its operation by relatively unskilled personnel.

This invention has, as its broad objectives the provision of novel and improved and wholly practical apparatus, arranged as an integrated system, for enabling single-aisle (occasionally plural-aisle) storage facilities to be manufactured, installed and utilized economically and effectively. As one of the more specific features of the invention, a novel automated storage system is provided which includes novel, automatic control facilities effective to prevent moving a selected storage unit in a direction toward a solid stack of units, whereby damaging of the storage units through careless operation is avoided. In this respect, certain storage installations, adapted for storage of relatively heavy articles, for example, require relatively powerful motive equipment to effect movement of one or more units to form an access aisle at a desired point. If, therefore, through careless operation of the equipment, a storage unit is coupled to the motive means and caused to move toward a solid stack of units, rather than toward the existing, open aisle, substantial damage to the units might be experienced. Such a possibility is completely eliminated by the novel control apparatus of the present invention, which either de-energizes the motive apparatus or prevents its being coupled to the storage units, whenever an operator carelessly attempts to move a unit in the wrong direction.

More specifically, the invention is directed, in one respect, to an automatic control system as above described, which includes novel facilities for ascertaining automatically the location of the open aisle and for comparing the open aisle position to the position of a unit selected for movement in the forming of a new aisle. The system further compares the relative position of the selected unit with the direction of moving selected by the operator, and permits movement of the unit only if the operator selects the proper direction. In some forms of the invention, the operator is given no discretion whatever, as to direction, and the storage unit selected simply moves in the proper direction upon its mere selection.

As another specific aspect of the invention, the direction-discriminating control means mentioned above is provided through a novel and highly simplified electromechanical control circuitry, including a loop conductor arranged to energize a pair of loop relays, which are connected to the ends of the loop conductor. Novel switch arrangements are provided, whereby the loop conductor is supplied with relay-energizing potential only at a location corresponding to the open aisle, and whereby the loop conductor is opened at one side or the other of the supply conductor, upon selection of a particular storage unit for movement. Accordingly, one of the loop relays, corresponding to the direction of the selected unit from the open aisle, is de-energized. The actual movement of the selected unit is under the control of a circuit which includes a switch, actuated by the operator and corresponding to the direction in which he desires to move the unit, and normally closed and normally open, interconnected contacts of the loop relays. If the direction control switch actuated by the operator does not correspond to the energized combination of the loop relays, no movement of the storage unit takes place. This immediately calls the operator's attention to his error, whereupon he will actuate the proper switch for moving the selected unit toward the open aisle.

Another important aspect of the invention resides in the provision of novel and improved control facilities for de-energizing and/or disengaging the motive means, upon movement of a selected storage unit into a new aisle-forming position. In this respect, the apparatus of the invention advantageously incorporates one or more reciprocating pull bars for moving selected storage units from one position to another. Frequently, space considerations are such that the reciprocating stroke of the pull bar means is a fraction of the total movement required to shift a storage unit to a new aisle-forming position. This would seem to require that ultimate de-energization or disengagement of the motive means be carried out by means of the limit switches mounted on the units themselves and adapted to be actuated when an adjacent pair of units moves into a closed position. However, such arrangements frequently are not reliably precise, because of vibrations to which the storage units might be subjected. Accordingly, the control system of the invention utilizes a limit switch actuated by the pull bar means, as it reaches the end of its final stroke, to discontinue further movement of the storage units. Since more than one reciprocating stroke may be required to effect full movement, switch means on the storage units (descriptively referred to herein as aisle switches) are utilized to condition to pull bar limit switch for effective actuation on only the last stroke of the pull bar means. With this arrangement, inaccuracies in the actuation of the aisle switches do not effect the ultimate discontinuance of storage unit movement. Advantageously, the aisle switches used for this purpose also are used to supply the loop conductor with energizing potential at a point corresponding to the open aisle.

In one slightly modified form of the invention, discontinuance of storage unit movement is effected by limit switch means carried by the storage units but actuated by elements fixed with respect to the foundation structure, such as cam elements mounted on the ceiling of the building structure, over the movable storage units. While this modified arrangement does not have the substantial accuracy in operation of the system described above, it has substantially better accuracy than a system in which limit switch means are actuated by the moving together of two storage units, since at least one of the elements of the switch-actuator combination is fixed in relation to the foundation structure.

The invention also is directed to the provision of a variety of specific features and devices incorporated in the control circuitry, motive system, coupling facilities, etc., of the several forms of the invention and, for a better understanding of the above, specifically mentioned features and the several additional features of the invention, reference should be made to the following detailed specification, the appended claims, and to the accompanying drawings, in which:

Figure 1:
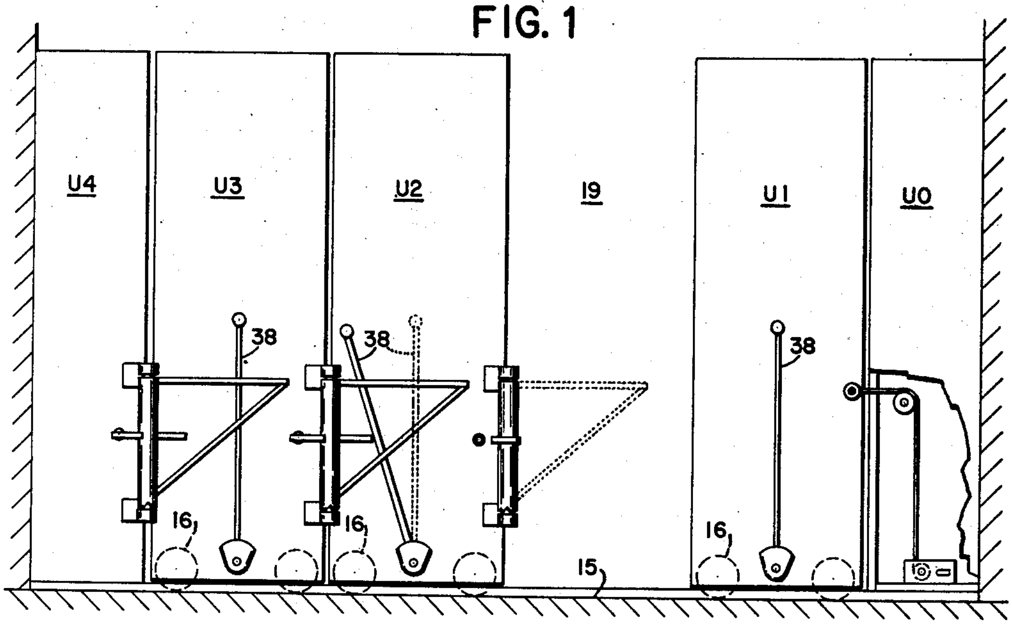
FIG. 1 is a side elevational view of a typical automated storage system incorporating features of the invention.

Referring now to the drawing, and to the preferred form of the invention, the references numerals U0–U4 (or U0–U5) represent a plurality of storage units, such as bins or shelves, arranged in a horizontal stack. The units U0, U4 (or U5), at the ends, advantageously are fixed to the foundation structure 15, while the intermediate units are mounted on wheels 16 for movement along parallel tracks 17, 18. The spacing of the end units is such, in relation to the number and dimensions of the intermediate units as to provide a single aisle space 19, from which access may be had to two of the units. The intermediate units are adapted to be moved, so that the location of the single aisle 19 may be changed to provide access to any of the units, as desired.

At the ends of the installation, there are provided sprockets 21, about which chains 22, 23 are trained. The ends of the chains engage a pair of pull bars 24, 25, which are supported by channels 26, for reciprocating movement beneath movable storage units. A crank arm 27 is fixed to sprocket 21 and is engaged by a connecting rod 28 pivoted on a crank wheel 29. The crank wheel 29 advantageously is in the form of a gear, which meshes with a pinion 30, driven by a motor 31. The throw of the connecting rod 28 is such, in relation to the length of the crank arm 27, that uni-directional rotation of the crank wheel 29 produces reciprocating movement of the crank arm 27 and sprocket 21. Accordingly, when the motor 31 is in operation, the pull bars 24, 25 reciprocate beneath the storage units.

Figure 2:
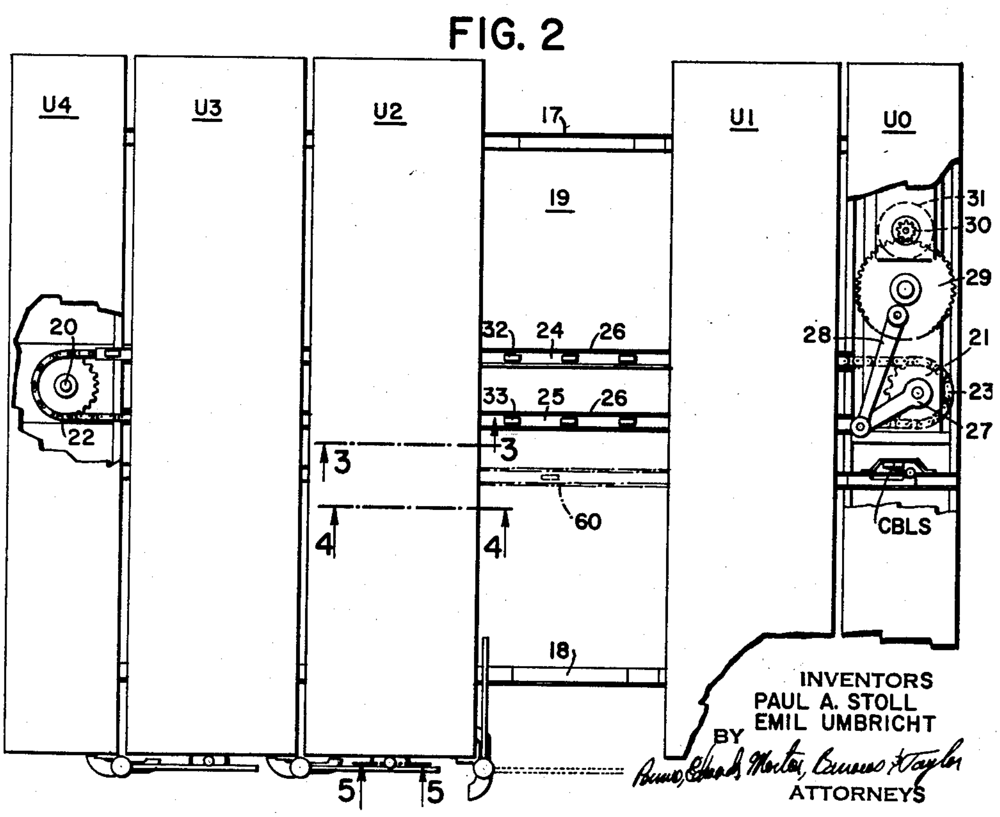
FIG. 2 is a top plan view of the system of FIG. 1, with parts broken away to show certain details.

As shown best in FIG. 2, the pull bars 24, 25 are provided periodically with coupling lugs 32, 33, respectively, adapted to be engaged with coupling dogs 34 or 35 (FIG. 3) provided in the bottom portions of each of the movable storage units. The coupling dogs 34, 35 are provided in pairs, so that coupling dogs overlie both of the pull bars 24, 25.

Figure 3:
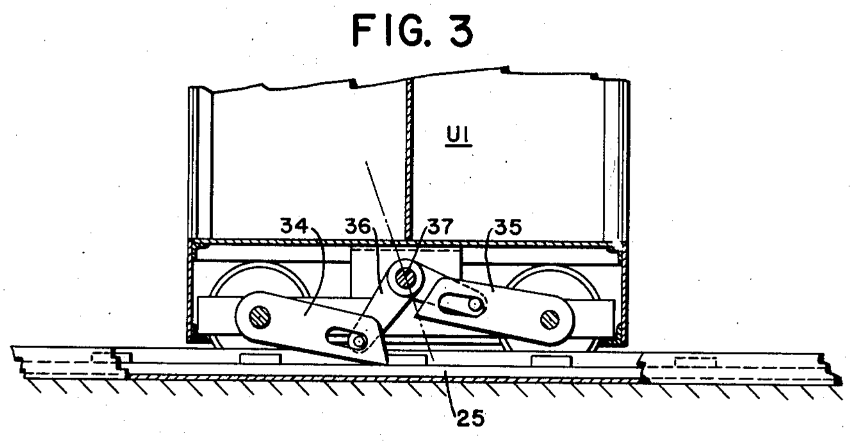
FIG. 3 is an enlarged fragmentary cross-sectional view taken generally along line 3—3 of FIG. 2.

To couple a storage unit to the pull bars, for movement along the tracks 17, 18, the coupling dogs of one type (e.g., the dogs 34) are lowered to the pull bars by control arms 36, substantially as shown in FIG. 3. Thus, when the bar 25, for example, is reciprocated to the left, as viewed in FIG. 3, the coupling dog 34 resting on that pull bar is engaged, and the storage unit is moved to the left. During the reverse reciprocating movement, the companion pull bar 24 is moving to the left, and the coupling dog 34 overlying that bar is picked up to continue the leftward movement of the storage unit, while a ratcheting action takes place between the pull bar 25 and its coupling dog, preparatory to a further reciprocating cycle.

Coupling of a storage unit for movement in either direction thus is effected by pivoting the control arms 36 counterclockwise or clockwise, as desired. Advantageously, this is accomplished by mounting the control arms on a shaft 37 which extends to one end of the movable unit and is engaged by an exposed control lever 38. Coupling therefore is effected by swinging the control lever 38 in the direction of the desired movement. Where desirable or expedient, of course, coupling could be effected by swinging the control lever away from the direction of desired movement.

The mechanism described above is illustrated and described in more detail in our before-mentioned co-pending application, Serial No. 823,876, filed June 30, 1959. Moreover, many of the other features described in said copending application may be incorporated in the system described herein, where desirable or expedient. Accordingly, reference may be made to the co-pending application for further details of certain features, which are not described at length herein to avoid needless repetition.

As will be understood, if a movable storage unit, such as the unit U2 illustrated in FIG. 1, which is positioned to the left of the open aisle 19, is coupled to the pull bars 24, 26 for movement in a direction to the left, or away from the open aisle, the motive mechanism will be stalled and/or substantial damage may be done to various parts of the apparatus, since the coupled unit moves against a solid stack. Thus, careless operation may result in damage, unless provision is made for rendering the motive means ineffective to move a coupled storage unit in the "wrong" direction. Accordingly, as one of the important features of the invention, novel control circuit arrangements are provided for assuring that transport of the moving storage units will take place only in the desired direction.

Figure 6:
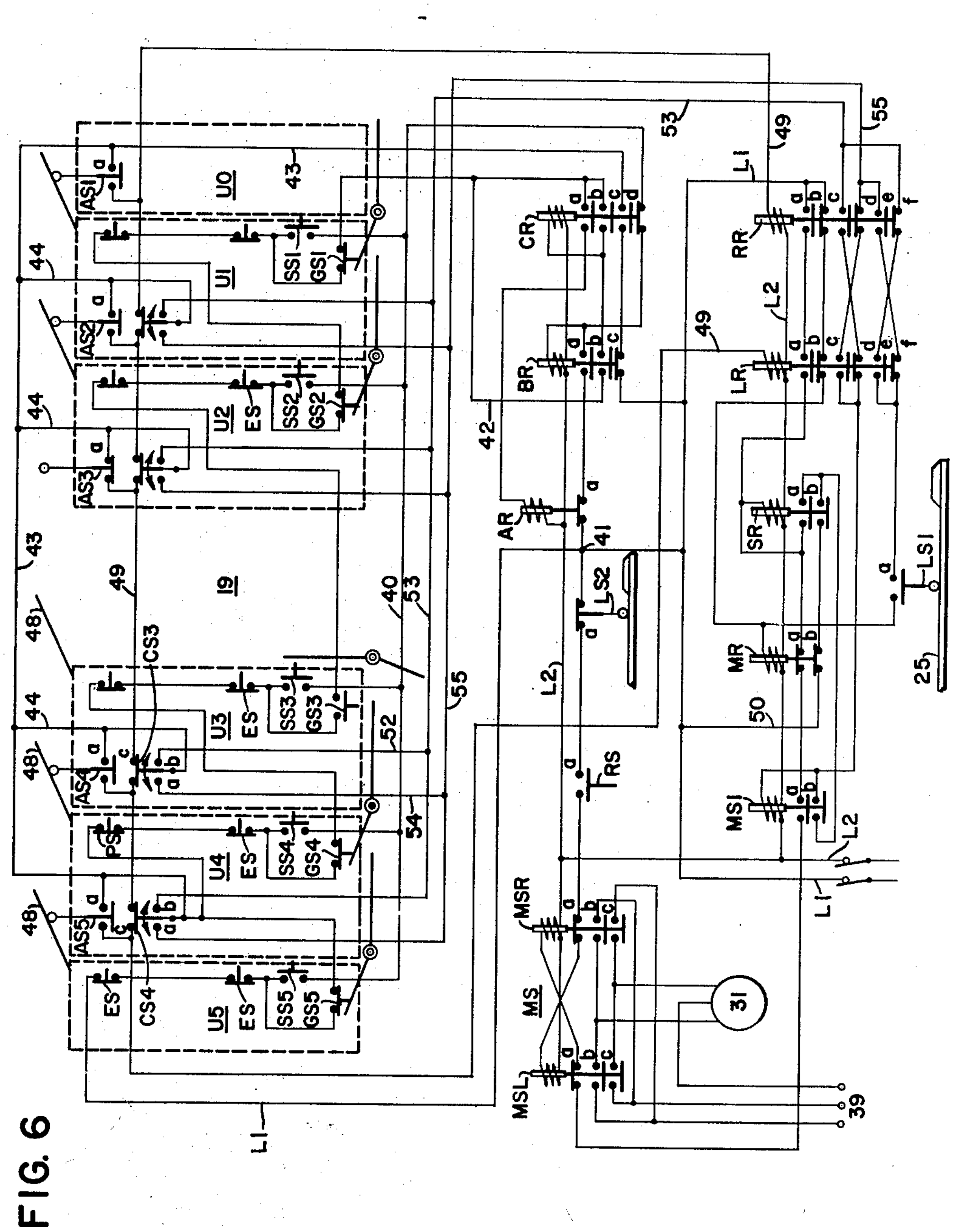
FIG. 6 is a simplified, schematic representation of a control circuit arrangement incorporating features of the invention and utilized in the operation of the apparatus of FIG. 1.

Referring now to FIG. 6, the drive motor 31 is connected to a power source 39 by a motor switch network MS, comprising relays MSL, MSR, energizable alternatively to operate the motor in either direction. The motor 31 is set in motion for normal operation by energization of relay MSR of the network MS, to cause reciprocation of the pull bars 24, 25.

As described in more detail in our before-mentioned co-pending application, it is advantageous to provide safety gate means at each possible aisle space, arranged so that not only must all gates be closed before the control system can be energized, but a conscious, unnatural motion of the operator, before closing a gate, is required, so that the system cannot be conditioned for operation by an operator carelessly closing the gate behind him as he enters the open aisle. Thus, in the improved circuit of FIG. 6, a source conductor L1, of opposite polarity from conductor L2, is connected through certain closed ones of a series of gate switches GS1–GS5 and emergency switches ES to one of a series of safety switches SS1–SS5 at the open aisle (e.g., safety switch SS3 in the specific illustration of FIG. 6). When this safety switch is closed, which requires an unnatural motion on the part of the operator, a series circuit is completed from the source conductor L1 through switch SS3, conductor 40, and normally closed contacts CR*d* of a relay CR to the coil of a second control relay BR. The relay BR thus is energized to close normally open contacts "*a*" and "*b*" thereof and open normally closed contacts "*c*" thereof. Only momentary closure of the safety switch is required, as the relay BR is self-holding through a circuit including contacts BR*a*, normally closed contacts AR*a* of a third control relay AR, a connection 41 to the source conductor L1.

After closure of the safety switch, a subsequent closure of the gate switch (e.g., GS3 in the illustration of FIG. 6) completes circuit from the source conductor L1 through each of the emergency switches and each of the gate switches GS1–GS5 in series, conductor 42 and now closed contacts BR*b* to the coil of the relay CR. The relay CR thus is energized and is self-holding through now closed contacts CR*b*. Energization of the relay CR competes an energizing circuit through contacts CR*a* to the relay AR, and opens the circuit through contacts CR*d*, so that energizing potential is isolated from the relay BR, causing the latter to drop out. At this time, a circuit from the source conductor L1 is completed through now closed contacts BR*c* and CR*c* to a supply conductor 43, whose function will be described in more detail.

A plurality of supply lines 44, one for each possible aisle space, are connected to the supply conductor 43 and to the contacts of respective switches AS1–AS5 (descriptively referred to as aisle switches) carried by certain of the storage units, namely units U0–U4. On other units, namely, U1–U5, there are provided cams 48 which, when adjacent units are together, actuate the respective aisle switches therefor to maintain the aisle switch contacts "*a*" open. At the open aisle, the aisle switch is released, causing the contacts thereof to be closed. In the illustrated example, the aisle switch AS3 is released, so that the switch contacts AS3*a* thereof are closed.

Thus, at a point corresponding to the location of the open aisle 19, the supply conductor 43 is connected to a conductor 49, which will descriptively be referred to as a loop conductor. The opposite ends of the loop conductor 49 are connected to respective relays LR, RR, which will be referred to descriptively as loop relays. One terminal of each of the loop relays LR, RR is connected to the source conductor L2 so that, when the loop conductor 49 is energized by the source conductor L1, as through the supply line 44 at the open aisle through the "*a*" contacts of aisle switch AS3 and the supply conductor 43, both of the relays LR, RR will be energized. As will appear more clearly in the following description, the initial or standby condition of the control circuitry, after proper actuation of the safety gate circuitry, is such that the loop conductor 49 is energized throughout from the source conductor L1, and the loop relays LR, RR stand by in an energized condition.

The energized, standby condition of loop relays LR, RR causes the completion of a circuit from the source conductor L1 through the now closed contacts LR*a* and RR*a* of the respective loop relays, to a start relay SR, which thus is caused to be energized. The start relay SR is self-holding, independently of the loop relays LR, RR, through a conductor 50, normally closed "*b*" contacts of a motor relay MR, and its own closed contacts SR*a*, SR*b*.

With the system in standby condition, as above described, a selected storage unit may be moved, to form a new aisle, by manipulation of the appropriate control lever 38. Assuming, for example, that the operator desires to provide an open aisle between the units U3, U4, the operating lever 38 for the unit U3 is pivoted in a predetermined direction, advantageously to the right or toward the existing, open aisle 19, to lower the dogs 35 onto the pull bars 24, 25 while raising the dogs 34. The unit U3 thereupon is coupled to the pull bars and, upon continued operation of the pull bars, the unit U3 will move to the right, pushing with it the unit U2, until the original aisle is completely closed and a new aisle formed.

Figure 5:
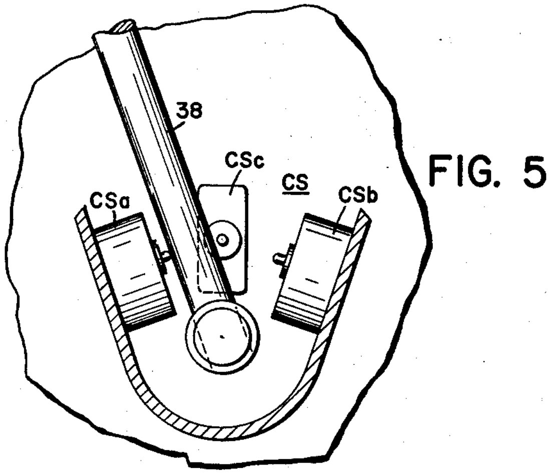
FIG. 5 is an enlarged, fragmentary cross-sectional view of a control lever and switch arrangements incorporated in the apparatus of FIG. 1.

As shown in FIG. 5, a control switch grouping CS, including contacts CS*a*, CS*b* and CS*c*, is cooperatively related with each of the control levers 38. The switch contacts CS*a*, CS*b* are normally open and are closed only upon pivoting movement of the lever in one direction or the other to effect coupling of the storage unit with the pull bars. When the lever 38 is pivoted in either direction, the control switch contacts CS*c* are opened, these contacts being closed, however, when the control lever 38 is in its upright or neutral position.

Thus, referring again to FIG. 6, and assuming a movement to the right of the control lever 38 for the storage unit U3, the switch contacts CS3*b* will be closed, while the contacts CS3*c* are open. When the contacts CS3*c* are open, the loop conductor 49 is broken between the supply point, through the aisle switch AS3, and the left-hand loop relay LR. The loop relay LR thus is de-energized and this action, in effect, advises the circuitry that the location of the desired aisle is to the left of the existing aisle and, therefore, that the selected unit U3 must move to the right.

Upon deenergization of the loop relay LR, contacts RR*c* and LR*d* are cross connected, providing a circuit to the coil of relay MS–1, this circuit including conductors 52, 53 and contacts CS3*b* of the control switch. Accordingly, the relay MS–1 is energized, becoming self-holding through its now closed "*b*" contacts and providing a circuit through its "*a*" contacts and the "*a*" contacts of network relay MSL to the coil of network relay MSR. The latter thereupon is energized to set the motor 31 in motion in the direction desired.

It should be noted that in the event of manipulation of the control lever 38 in the "wrong" direction, a circuit will be set up from the supply conductor 44, contact CS3*a* and conductors 54, 55 to contacts RR*e*, which are cross connected with contacts LR*f* by reason of deenergization of relay LR. The limit switch LS1 is closed at this time, as will be explained further, so that the motor relay MR is energized and the start relay SR is deenergized. This opens all circuits to the motor switch network MS, preventing operation of the motor 31.

Assuming the operator to have coupled the selected storage unit U3 for proper movement to the right, the unit first will be picked up by the pull bar 24, which advances it a distance equal to the amplitude of the pull bar stroke which, by design, equals one-half the center-to-center spacing between the coupling lugs 32 (or 33). At the end of the full stroke to the right of the pull bar 24, the storage unit U3 is picked up by a lug 33 on the pull bar 25, and the movement to the right of the storage unit is continued.

Although other arrangements may be provided, the pull bar mechanism advantageously is so designed, in relation to the required movement of storage units in forming a new aisle, that an even number of half-cycle operations will advance the unit the exact distance desired. Generally, space considerations with reference to the maximum possible stroke of the pull bars 24, 25 require that several complete cycles of operation be utilized to advance a storage unit throughout the desired distance. Thus, by way of example and not of limitation, a system may be designed to advance the storage units the required distance in three complete reciprocating cycles, each consisting of a half-cycle pulling stroke by each pull bar. The positions of the respective pull bars 24, 25 thus will be the same at the end of every aisle forming operation so that, as will be explained in more detail, the action of the pull bars may be utilized to shut down the motive system at the proper time.

At the instant when the selected storage unit U3 is coupled to the pull bars for movement to the right, the storage unit may be considered to be at a first zonal point, descriptively referred to as zonal point I. After a short movement of the unit U3, throughout a distance less than the movement caused by a full stroke of the pull bars (in some cases, perhaps, less than that caused by the half stroke of the pull bars), the aisle switch AS4 adjacent the newly forming aisle is released by its cam 48 and the contacts AS4*a* thereof are closed. There are now two closed aisle switches, so that the loop conductor 49 is supplied with energizing potential through supply lines on opposite sides of the now open control switch contacts CS3*c*. Thus, when the aisle switch AS4 is released, at a point which may be referred to descriptively as zonal point II, the loop relay LR is reenergized, the second loop relay RR remaining energized. The circuit including the energized conductor 53 now is open, but this is of no consequence, as the relay MS–1 is self-holding.

Continued movement to the right of the storage unit U3 (carrying with it any storage units which may lie between it and the original aisle) ultimately causes the aisle switch AS3 to be engaged by the cam 48 on the unit U3 and depressed to open the contacts AS3*a*. At this point, which descriptively may be referred to as zonal point III, the loop conductor 49 is supplied with energizing potential through only one supply line, which is to the left of the open switch contacts CS3*c*. Accordingly, the right-hand loop relay RR is deenergized, while the left-hand loop relay LR remains energized.

Since the opening of contacts AS3*a* occurs at or near the end of the travel of the moving storage units, it would be possible to utilize the opening of these contacts to render the motive system ineffective, and the invention contemplates utilizing such an advantageous expedient where feasible. However, practical experience has shown that the storage units are subject to a certain amount of jerking and vibratory movements, for example, so that the exact instant of actuation of the aisle switch is not reliably precise. Accordingly, as one of the specific aspects of the invention, the cam 48 is caused to depress the aisle switch AS3 slightly in advance of the final position of the moving storage units. The exact instant of opening of the aisle switch AS3 is not important, as long as it is at some point beyond the start of the last full cycle of operation of the pull bars.

After the zonal point III has been reached, and the right-hand loop relay RR deenergized, the circuit through conductor 53 is completed through now closed, cross connected contacts RR*f* and LR*e* up to the pull bar limit switch LS1. At this instant, however, the limit switch LS1 is open, by reason of the pull bars being at an intermediate stage of their final stroke. As the final stroke is completed, the pull bar 25 moves to the end of its stroke and, in doing so, trips the limit switch LS1 to close its contacts and thereby completes an energizing circuit to the motor relay MR. The contacts MR*a* are thereupon opened to deenergize the motor switch relay MRS and shut off the motor 31. Holding circuits for relays MS–1 and SR also are opened and these relays are de-energized.

The circuit remains in this standby condition until one of the gate switches (in this instance the gate switch GS4 at the newly formed aisle) is opened, de-energizing the relays CR and AR. The opening of contacts CR*c* disconnects the supply conductor 43 from the source conductor L1 and thereupon de-energizes the remaining relays of the system. A further operation is initiated by actuation, in proper sequence, of the safety switch SS4 and gate switch GS4, substantially as before described.

In the event the position of the aisle to be formed is to the right of the existing aisle as, in the case of the illustration of FIG. 6, between the units U0, U1, the appropriate control lever 38 will be moved to the left and the sequence of operation of the loop relays RR, LR will be the reverse of that described above. In all other respects, however, the operation of the system will be substantially the same.

In the event that an object or person inadvertently remains in a closing aisle space, despite the before described precautionary measures, the system may be shut off by opening one of the emergency switches. This breaks the holding circuit for the relay CR, de-energizing that relay and, consequently, all other relays of the system together with the drive motor 31. The system then can be restarted in one of two ways: either by sequentially closing the safety and gate switches for an accessible aisle, or by closing a reverse switch RS to energize network relay MSL and effect reverse operation of the motor 31. The latter procedure will cause the moving unit to be backed off to free any trapped object. The limit of the backoff is determined by a limit switch LS–2 actuated by a connecting rod, which may be associated with the storage units or with the pull bars.

Figure 4:
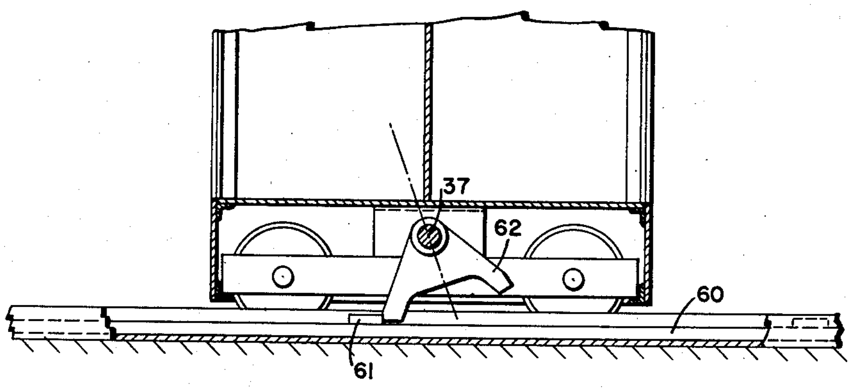
FIG. 4 is an enlarged, fragmentary cross-sectional view of an optional control arrangement which may be incorporated in the apparatus of FIG. 1, the cross-sectional view being taken generally along line 4—4 of FIG. 2.

If, for any reason, it is desirable or expedient to employ a motor control shut-off system of the general type described in our co-pending application Serial No. 823,876, a control bar 60 illustrated in FIG. 4 and shown in broken lines in FIG. 2 may be provided. The control bar 60 has widely spaced lugs 61 adapted for cooperation with dogs 62 fixed to the control shaft 37. When the shaft 37 is pivoted in one direction or the other to couple a unit to the pull bars, the control dogs 62 are pivoted so that one of the dogs is in position to engage a control bar lug 61. As the coupled unit reaches the end of its movement, the lug 61 is picked up and shifted a distance sufficient to trip a limit switch CBLS (FIG. 2). With reference to FIG. 6, the alternative arrangement may be provided by utilizing, in place of the limit switch PLS, the limit switch CBLS.

Figure 7:
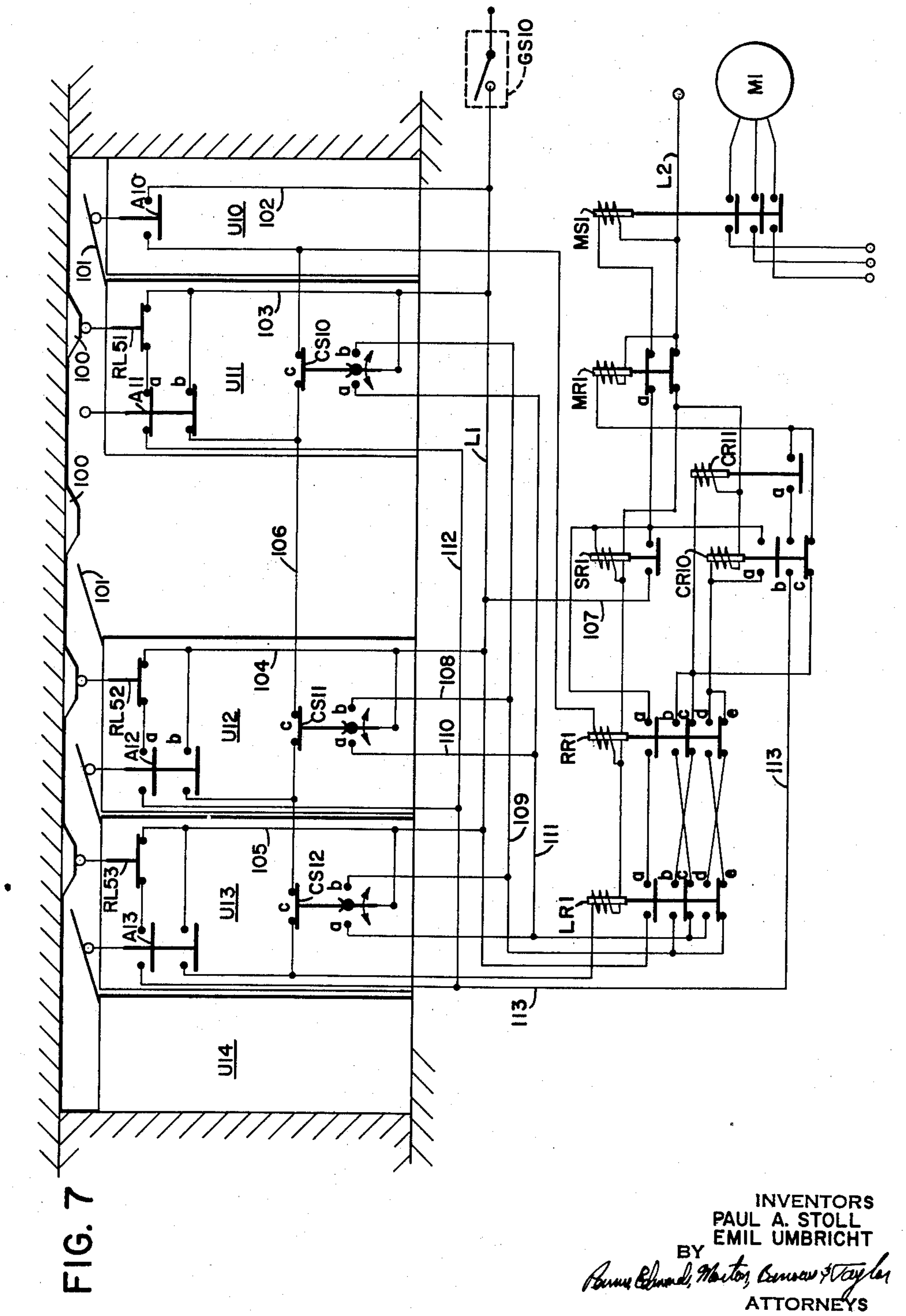
FIG. 7 is a simplified schematic representation of a slightly modified form of control circuitry for use in connection with an apparatus of the general type shown in FIG. 1.

The circuit arrangement of FIG. 7 is similar in many respects to that of FIG. 6, but represents a slight departure therefrom in that control of the distance of movement of selected movable storage units is accomplished by limit switches RL51–RL53 which, when the units move into new aisle forming positions, engage cams 100 fixed to the foundation structure or fixed with reference thereto, such as to the ceiling of the structure. The modified arrangement, while perhaps not characterized by the substantial accuracy of control of the circuit arrangement of FIG. 6, provides more accurate control than would be obtained through the use for this purpose of aisle switches A10–A13, for example, since at least one of the cooperating parts, specifically the roof-suspended cams 100, are not subject to jerking or vibrational movements which may be expected of the moving storage units. Likewise, although the aisle switches A10–A13 of the FIG. 7 circuit arrangement are actuated by means of cams 101 mounted on adjacent storage units, it will be understood that the aisle switches also may be actuated by roof-suspended cam elements, if desirable or expedient.

In the circuit arrangement of FIG. 7, the safety gate switch means is represented schematically at GS10, and it is assumed that this switch is closed to connect a conductor L1 to one terminal of a source. A conductor L2 constitutes the other terminal of the source. A plurality of supply lines 102–105 connect the source conductor L1 with the several aisle switches, and the supply line 103, in the illustrated example, completes a circuit through closed contacts "*b*" of the released aisle switch A11 to a loop conductor 106. In standby, the loop conductor 105 maintains a pair of loop relays LR1, LR2 in an energized condition, completing a circuit from the source conductor L1 through closed contacts LR1*a*, RR1*a* to the coil of a starter relay SR1. The relay SR1 is thus energized, holding through a conductor 107 and completing a circuit through normally closed contacts "*a*" of a motor relay MR1 to a motor switch relay MS1, which is energized to start a drive motor M1. To move the unit U12, for example, to the right control switch CS11 is actuated to open contacts "*c*" thereof and close contacts "*b*" thereof. This de-energizes the loop relay LR1 and completes a circuit through contacts CS11*b*, conductors 108, 109, now closed contacts LR1*e*, and cross-connected, closed contacts RR1*d* to the energizing circuit of a relay CR10. The relay CR10 is self-holding through contacts "*a*" thereof and, when energized, closes contacts "*b*" thereof and opens contacts "*c*".

If the control switch CS11 were operated in the wrong direction, the relay LR1 still would drop out and a circuit, in this case, would be completed through closed contacts CS11*a*, conductor 110, conductor 111, cross-connected contacts LR1*c*, RR1*b*, and normally closed contacts CR10*c*, to the motor relay MR1. This immediately would energize the relay MR1 to de-energize the motor switch MS1 and shut off the motor.

With the unit U12 properly coupled and moving to the right, the limit switch RLS2 first opens, followed shortly thereafter by releasing of the aisle switch A12. Both contacts "*a*" and "*b*" of the aisle switch A12 are now closed, but no circuit is completed through the contacts A12*a*, by reason of the open condition of limit switch RLS2. A parallel circuit is, however, completed through the circuit including supply conductor 103, closed limit switch RLS1 and aisle switch A11, and conductors 112, 113 through the now closed "*b*" contacts of relay CR10. Completion of this circuit is without effect, at this time, because of the open condition of a further relay CR11.

As the moving unit U12 nears the end of its movement, the aisle switch A11 is opened by engagement thereof with the aisle switch cam 101 on the unit U12. This opens the parallel circuit just described without effect. Shortly thereafter, continued movement causes the limit switch RLS2 to be closed, by engagement with the cam 100 directly above the previously open aisle.

Upon the opening of the aisle switch A11 and prior to the closing of the limit switch RLS2, the loop conductor 106 is dead to the right of the switch contacts CS11*c*, so that the right-hand loop relay RR1 is de-energized. This completes a circuit through contacts LR1*b* and cross-connected contacts RR1*c* to the relay CR11, which is thereupon energized to close contacts CR11*a* thereof. At this point a circuit is completed from the supply line 104, through limit switch RLS2 and aisle switch A12 to the motor relay MR1, which energizes to shut off the motor M1.

Subsequent opening of the gate switch GS10, to gain access to the newly formed aisle, de-energizes the entire system.

Movement of any of the units toward the left, of course, results in substantially the same sequence of operations, excepting the order of operation of the loop relays LR1, RR1, which is reversed.

In a preferred form of the invention, it is not possible for an operator to move a selected unit the "wrong" way, into a solid stack of units, whereby substantial damage could occur, particularly in heavy duty installations requiring relatively powerful motive systems. In the invention, illustrated in FIGS. 1–7, the motive system simply is rendered ineffective upon a wrong choice of direction by the operator, the new circuit arrangements continuously monitoring the location of the existing aisle with respect to the location of the unit selected for movement.

It should be understood that the various forms of the invention specifically illustrated and described herein are intended to be illustrative only, as certain modifications and recombinations thereof may be made without departing from the clear teachings of the disclosure. Accordingly, reference should be made to the following appended claims in determining the full scope of the invention. In the claims, the term "coupling motor" or equivalent, should be construed to include such equivalent facilities as solenoids, relays, valves, etc., where the ultimate function is to effect coupling or movement of the storage units. The term also should be construed to include individual drive motors for the units, which exert motive power, rather than merely couple the units to a separate motive means.

We claim:

1. An automated storage system comprising a plurality of storage units, means mounting at least certain ones of said storage units for movement along a path to form an aisle space between predetermined adjacent units, motor driven means for moving the movable units in opposite directions along said path, coupling means for coupling selected units to said motor driven means for movement in a desired direction, and control means for rendering operative one of said coupling and motor driven means only upon attempted coupling of selected units for movement toward an open aisle space, said control means comprising first and second relays, conductor means for energizing said relays, switch means responsive to the position of storage units with respect to an open aisle and to actuation of said control means to cause de-energization of said first relay and energization of said second relay; upon attempted coupling of a unit on one side of an aisle, and energization of said first relay and de-energization of said second relay, upon attempted coupling of a unit on the other side of an aisle, and circuit means including contacts of said relays for rendering said coupling means and motor driven means operative simultaneously upon attempted coupling of a unit for movement toward an open aisle, said circuit means rendering inoperative one of said coupling and motor driven means upon attempted coupling of a unit for movement away from an open aisle.

2. An automated storage system comprising a plurality of storage units, means mounting at least certain ones of said storage units for movement along a path to form an aisle space between predetermined adjacent units, a reciprocating pull bar disposed along said path and engageable with a selected unit to move it in a desired direction, the amplitude of the reciprocating movement of said pull bar being a fraction of the movement required to open an aisle space, motor drive means connected to said pull bar for causing reciprocating movement thereof to render said pull bar effective to move a selected unit, and control means for said motor drive means comprising aisle switch means mounted on adjacent storage units and actuated upon movement of one or more selected units, in closing an existing aisle space and forming new space, for conditioning the motor drive means to render said pull bar ineffective to move said selected unit, a pull bar limit switch actuated by said pull bar at one end of its reciprocating movement, circuit means including said aisle switch means and said limit switch, when actuated together, for conditioning said motor means to render said pull bar ineffective to move said selected unit, said limit switch being inoperative, when actuated alone, to so condition said motor means, a loop conductor, a loop relay connected to each end of said conductor, supply conductor means including said aisle switch means for connecting said loop conductor to one terminal of a power source, said loop relays being connected to the other terminal of said source, control circuit means for causing only a preselected one of said loop relays to be energized and thereby conditioning said motor means to render said pull bar effective, means including a first aisle switch means for adjacent units being separated to cause the other of said loop relays to be energized, and means including a second aisle switch for adjacent units being closed by said pull bar for causing said one loop relay to be de-energized, said limit switch being operative, when said one loop relay is de-energized, to condition said motor means to render said pull bar ineffective.

3. An automated storage system comprising a plurality of storage units, means mounting at least certain ones of said units for movement along a path to form an aisle space between predetermined adjacent units and permitting movement of said ones only toward a previous open aisle space, drive means for moving selected ones of said units, and control means for preventing movement of a selected unit in a direction away from an open aisle, said control means comprising a pair of relays, loop conductor means connected at its opposite ends to said relays, supply conductor means connected at an open aisle to said loop conductor and connected to a source of power, control circuit means for causing energization of only one of said relays, in accordance with the location from an open aisle of a unit selected to be moved, including control switches on movable ones of said units for opening said loop conductor between said supply conductor means and a selected one of said relays, and conductor means including normally open contacts of said one relay and normally closed contacts of the other relay for rendering said drive means effective for movement of a selected unit toward an open aisle.

4. An automated storage system comprising a plurality of storage units, means mounting at least certain ones of said storage units for movement along a path to form an aisle space at a preselected position between units, a pair of pull bars mounted for reciprocating movement adjacent the movable units, motor driven means for reciprocating said pull bars simultaneously in opposite relation throughout a length of stroke equal to a fraction of the distance required to move a storage unit to a new aisle-forming position and which is the inverse of an even integer greater than two, coupling lugs on each pull bar spaced apart a distance equal to one-half the length of said stroke, limit switch means coacting with one of said pull bars and operative, when said one pull bar completes its stroke at one end to de-energize said drive motor, and control means including switch means associated with the pull bar-actuated limit switch for rendering said limit switch ineffective until the last full cycle of a reciprocation of said pull bars.

5. An automated storage system according to claim 1, in which said control means includes cooperating aisle switch means on adjacent ones of said units actuated to a first condition when adjacent units are closed and to a second condition when adjacent units are separated to form an aisle, direction discriminating means including a loop conductor connected at its ends to said relays, means comprising said aisle switch means, when actuated to said second condition, for connecting said loop conductor to a terminal of an electrical supply source, and control switch means associated with each of said movable units for opening said loop circuit conductor on one side or the other of said aisle switch means and conditioning said coupling and motor driven means for simultaneous operation when said loop conductor is open on the side of said aisle switch means away from an open aisle.

6. An automated storage system comprising a plurality of storage units, means mounting at least certain ones of said storage units for movement along a path to form an aisle space between predetermined adjacent units and permitting movement of said ones only toward a previous open aisle space, motor driven means for moving the movable units in either direction along said path, coupling means for coupling selected units to said motor driven means for movement in a desired direction, control circuit means including a loop conductor, a loop relay connected to each end of said loop conductor, supply conductor means actuated by separation of a pair of adjacent storage units to supply power to said loop conductor for energizing said loop relays, control switch means actuated by the coupling means for a selected unit on one side of an open aisle to open said loop conductor between said supply conductor means and one of said loop relays and by the coupling means for a selected unit on the other side of an open aisle to open said loop conductor between said supply conductor means and the other of said loop relays, and means comprising said loop relays and said coupling means for preventing simultaneous actuation of said coupling means and said motor driven means upon attempted coupling of a selected unit to move in a direction away from the open aisle.

7. An automated storage system according to claim 6, in which the coupling means comprises a coupling lever on each movable storage unit, each of said levers having a neutral position and being movable in two directions from said neutral position according to the desired direction of movement of the storage unit, first coupling switch means closed by movement of a lever in a first direction, second coupling switch means closed by movement of a lever in a second direction, said coupling switches and said loop relays forming interrelated circuit means to prevent simultaneous operation of said coupling means and said motor driven means when a lever is moved in a direction tending to cause movement of a unit away from an open aisle.

8. An automated storage system according to claim 7, in which said control switch means comprises a switch for each movable storage unit associated with the coupling lever thereof and actuated to an open condition to open said loop conductor, by movement of such lever in either direction.

9. An automated storage system according to claim 6, in which said supply conductor means includes a plurality of parallel supply lines connecting said loop conductor to one terminal of a power source, said supply lines being equal in number to the possible aisle positions which may be formed by movement of selected storage units, an aisle switch in each supply line positioned to be actuated to an open condition by movement of a selected storage unit to close an aisle space, whereby said loop conductor is supplied only through that supply line associated with a then open aisle space.

10. An automated storage system according to claim 9, in which said aisle switches are carried by certain of said storage units, and aisle switch actuating means are carried on storage units adjacent each of said certain units.

11. An automated storage system comprising a plurality of storage units, means mounting at least certain ones of said storage units for movement along a path to form an aisle space between predetermined adjacent units, a reciprocating pull bar disposed along said path and engageable with a selected unit to move it in a desired direction, the amplitude of the reciprocating movement of said pull bar being a fraction of the movement required to open an aisle space, motor drive means connected to said pull bar for causing reciprocating movement thereof to render said pull bar effective to move a selected unit, and control means for said motor drive means comprising aisle switch means mounted on adjacent storage units and actuated upon movement of one or more selected units, in closing an existing aisle space and forming new space, for conditioning the motor drive means to render said pull bar ineffective to move said selected unit.

12. An automated storage system according to claim 11, in which said control means includes a pull bar limit switch actuated by said pull bar at one end of its reciprocating movement, and circuit means including said aisle switch means and said limit switch, when actuated together, for conditioning said motor means to render said pull bar ineffective to move said selected unit, said limit switch being inoperative, when actuated alone, to so condition said motor means.

13. An automated storage system according to claim 2, in which said control circuit means includes control switches on the movable ones of said storage units, and said supply conductor means connect said loop conductor between control switches of separated units, said control switches being operable to open said loop conductor between said supply conductor means and a certain one of said loop relays determined by the direction of an open aisle from the unit on which the actuated control switch is mounted.

14. An automated storage system according to claim 12, in which said aisle switch means includes an aisle swtich for each possible aisle location, and control switch means are provided for intially conditioning said motor means to render said pull bar effective while said limit switch and the aisle switch for the last-closed aisle remain actuated together.

15. An automated storage system comprising a plurality of storage units, means mounting at least certain ones of said units for movement along a path to form an aisle space between predetermined adjacent units and permitting movement of said ones only toward a previous open aisle space, drive means for moving selected ones of said units, and control means for preventing movement of a selected unit in a direction away from an open aisle, said control means comprising a pair of relays, control circuit means for causing energization of only one of said relays, in accordance with the location from an open aisle of a unit selected to be moved, and conductor means including normally open contacts of said one relay and normally closed contacts of the other relay for rendering said drive means effective for movement of a selected unit toward an open aisle.

16. An automated storage system comprising a plurality of storage units, means mounting at least certain ones of said storage units for movement along a path, motor driven means for moving a selected unit in either direction, and control means for effecting movement of a selected unit only in a direction toward an open aisle, said control means comprising a pair of relays, means to energize said relays in a first combination when the open aisle is on one side of the selected unit and in a second combination when the selected unit is on the other side of the open aisle, first control circuit means including a first switch, normally open contacts of one of said relays, and normally closed contacts of the other of said relays, second control circuit means including a second switch, normally closed contacts of said one relay, and normally closed contacts of said one relay, and normally open contacts of said other relay, said first and second switches being actuable in accordance with the desired direction of movement of a selected unit, said system being energizable to cause movement of a selected unit when a predetermined circuit relationship is established by said first and second control circuit means upon actuation of one of said first or second switches.

17. An automated storage system comprising a plurality of storage units, means mounting at least certain ones of said storage units for movement along a path to form an aisle space at a preselected position between units, a pair of pull bars mounted for reciprocating movement adjacent the movable units, motor driven means for reciprocating said pull bars simultaneously in opposite relation throughout a length of stroke equal to a fraction of the distance required to move a storage unit to a new aisle-forming position, coupling lugs on each pull bar spaced apart a distance equal to one-half the length of said stroke, limit switch means coacting with one of said pull bars and operative, when said one pull bar completes its stroke at one end to deenergize said drive motor, and control means for rendering said limit switch ineffective until the last full cycle of reciprocation of said pull bars.

18. An automated storage system according to claim 1, in which said switch means comprises an aisle switch and actuating means therefor, one of said switch and actuating means being mounted to adjacent storage units between which an aisle space may be formed, said switch means being actuated to a first condition upon partial separation of adjacent units and to a second condition upon substantial closure of adjacent, separated units.

19. An automated storage system according to claim 17, in which said limit switch means comprises switches on each of said movable storage units, and actuator means for said switches independent of said units.

References Cited by the Examiner

UNITED STATES PATENTS

| | | | |
|---|---|---|---|
| 2,065,107 | 12/36 | Turner | 104—50 |
| 2,321,253 | 6/43 | Schellentrager | 104—50 |
| 2,397,185 | 3/46 | Krapf | 104—151 |
| 2,645,186 | 7/53 | Davis | 104—162 |
| 2,654,489 | 10/53 | Ingold | 214—16 |
| 2,707,442 | 5/55 | Ingold | 105—31 |
| 2,748,264 | 5/56 | Tizzard | 246—33 |
| 2,772,639 | 12/56 | Ingold. | |
| 2,847,945 | 8/58 | Merritt | 104—162 |
| 2,961,973 | 11/60 | Bozman | 104—162 |
| 3,055,313 | 9/62 | Stoll et al. | 104—162 |

LEO QUACKENBUSH, *Primary Examiner.*

JAMES S. SHANK, *Examiner.*

UNITED STATES PATENT OFFICE

CERTIFICATE OF CORRECTION

Patent No. 3,186,355 June 1, 1965

Paul A. Stoll et al.

It is hereby certified that error appears in the above numbered patent requiring correction and that the said Letters Patent should read as corrected below.

Column 7, line 48, for "MRS" read -- MSR --; column 13, lines 27 and 28, strike out "and normally closed contacts of said one relay"; column 14, line 12, for the claim reference numeral "1" read -- 4 --.

Signed and sealed this 7th day of December 1965.

SEAL)
ttest:

RNEST W. SWIDER
ttesting Officer

EDWARD J. BRENNER
Commissioner of Patents